(12) United States Patent
Kapaan et al.

(10) Patent No.: US 8,256,968 B2
(45) Date of Patent: Sep. 4, 2012

(54) WHEEL HUB BEARING UNIT FOR A VEHICLE AND A GASKET FOR SUCH A UNIT

(75) Inventors: Hendrikus Jan Kapaan, Nieuwegein (NL); Xiao Bo Zhou, Houten (NL)

(73) Assignee: Aktiebolaget SKF, Göteborg (SE)

( * ) Notice: Subject to any disclaimer, the term of this patent is extended or adjusted under 35 U.S.C. 154(b) by 360 days.

(21) Appl. No.: 12/451,716

(22) PCT Filed: May 31, 2007

(86) PCT No.: PCT/EP2007/004820
§ 371 (c)(1),
(2), (4) Date: Nov. 24, 2009

(87) PCT Pub. No.: WO2008/145162
PCT Pub. Date: Dec. 4, 2008

(65) Prior Publication Data
US 2010/0296760 A1 Nov. 25, 2010

(51) Int. Cl.
*F16C 13/00* (2006.01)
(52) U.S. Cl. .................... 384/544; 301/105.1
(58) Field of Classification Search ................ 384/544, 384/589, 492; 301/105.1, 108.1
See application file for complete search history.

(56) References Cited

U.S. PATENT DOCUMENTS

| | | | | |
|---|---|---|---|---|
| 2,956,632 A * | 10/1960 | Forbush et al. | ............... | 180/385 |
| 6,062,735 A * | 5/2000 | Ward | ............... | 384/492 |
| 6,626,579 B1 * | 9/2003 | Silvasi | ............... | 384/476 |
| 6,929,331 B2 * | 8/2005 | Ohtsuki | ............... | 301/105.1 |
| 2003/0062764 A1 * | 4/2003 | Vignotto et al. | ............... | 301/105.1 |
| 2006/0177169 A1 | 8/2006 | Takahashi et al. | | |
| 2007/0147719 A1 | 6/2007 | Komori | | |
| 2009/0148091 A1 * | 6/2009 | Kametaka et al. | ............... | 384/544 |

FOREIGN PATENT DOCUMENTS

| | | |
|---|---|---|
| DE | 4400773 A | 7/1995 |
| EP | 0800011 A2 * | 8/1997 |
| EP | 1318214 A | 6/2003 |
| WO | WO2005059386 A | 6/2005 |

* cited by examiner

*Primary Examiner* — Thomas R Hannon
(74) *Attorney, Agent, or Firm* — Mark A. Ussai; Bryan Peckjian

(57) ABSTRACT

The invention concerns a wheel hub bearing unit for a vehicle, said hub bearing unit comprising a rotating bearing ring member (1) and a non-rotating bearing ring member (2), where the rotating bearing ring (1) has at least a radially extending wheel mounting flange (4) with a reference flange surface (5), wherein a gasket (9) with at least a sacrificial metal gasket surface is provided on the flange surface (5). Hereby, corrosion protection of the surface of the wheel mounting flange of a hub bearing unit is realized in a cost-effective manner.

28 Claims, 3 Drawing Sheets

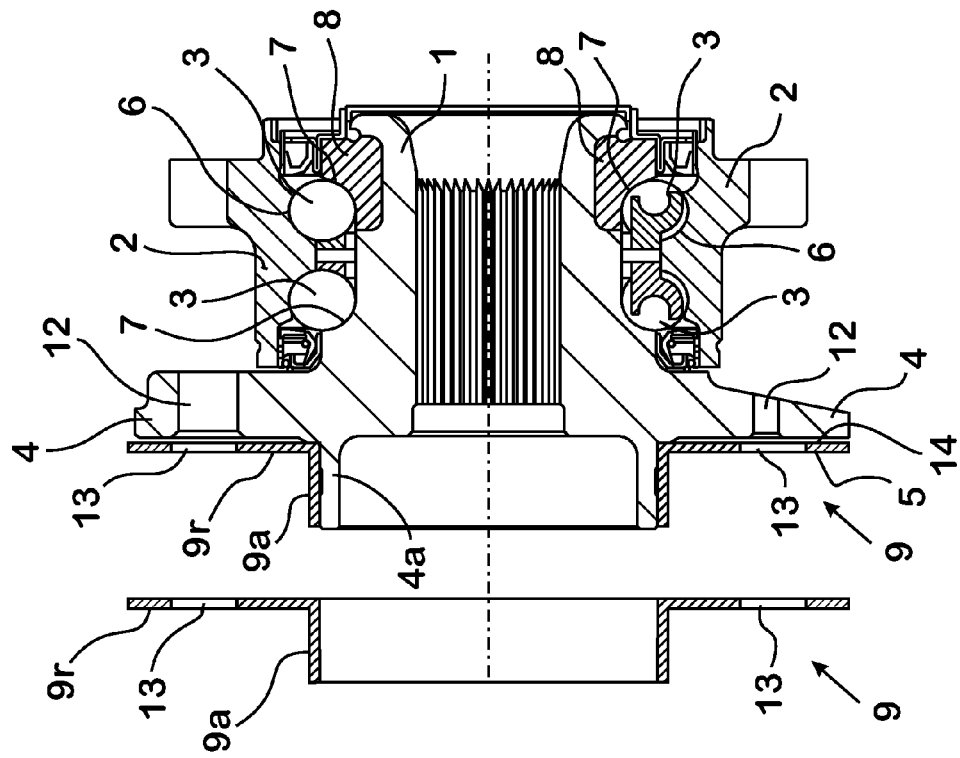
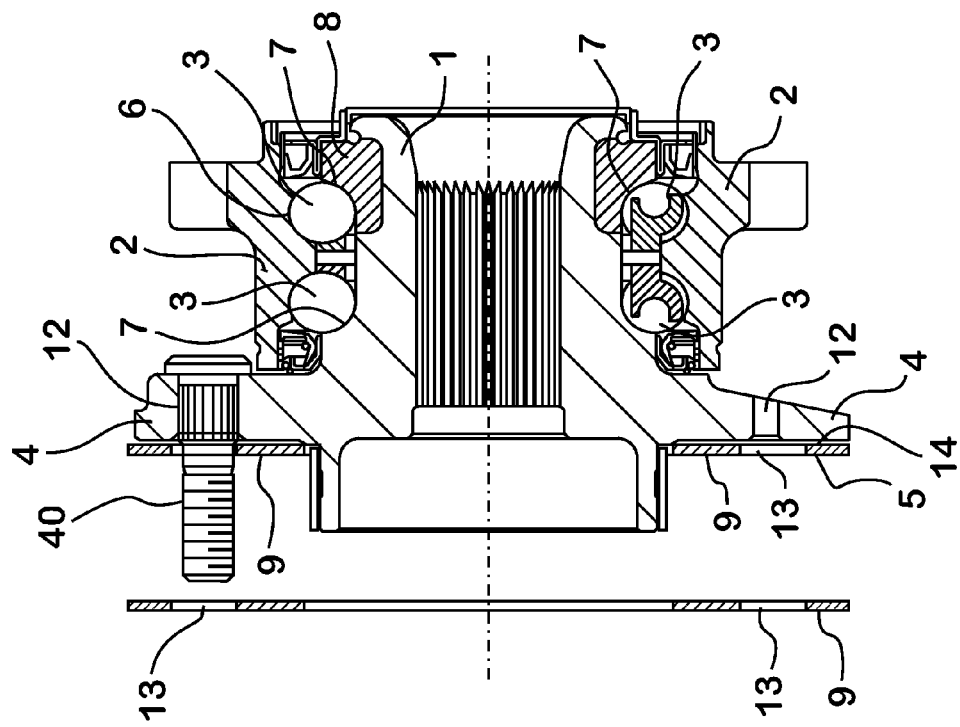

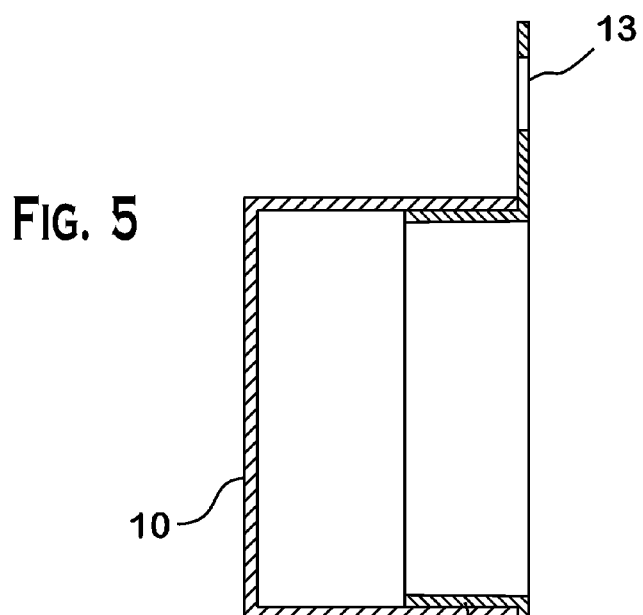
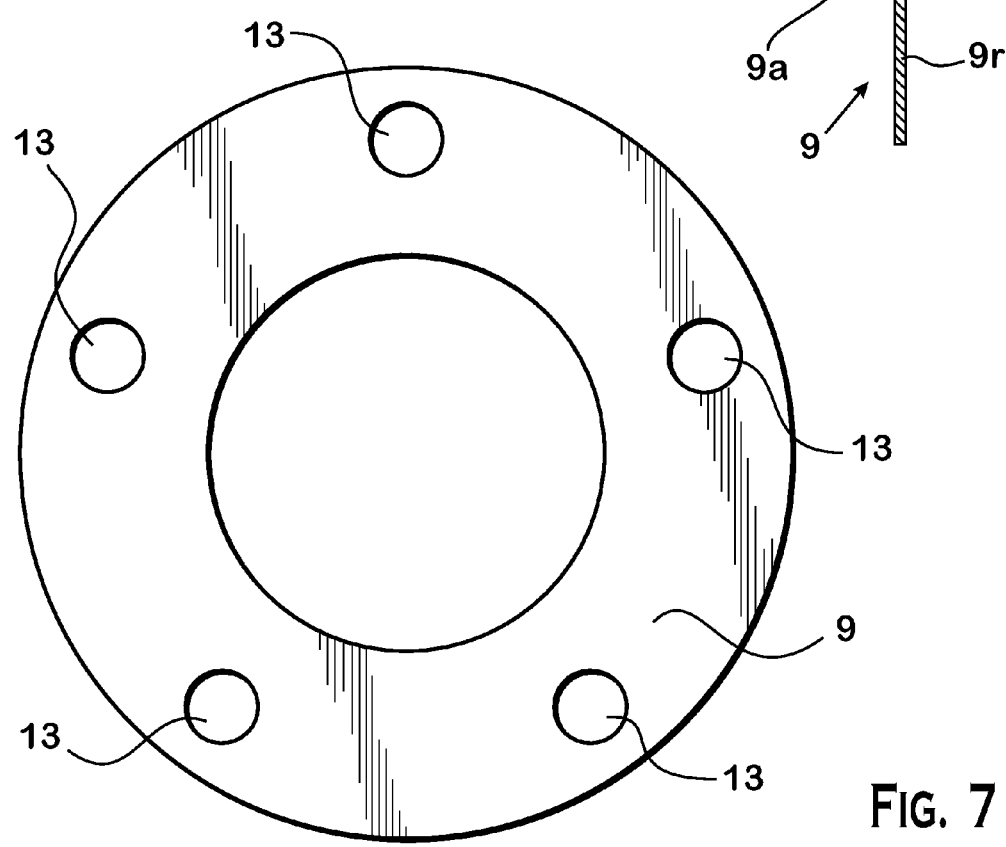

WHEEL HUB BEARING UNIT FOR A VEHICLE AND A GASKET FOR SUCH A UNIT

FIELD OF THE INVENTION

The present invention relates to a wheel hub bearing unit for a vehicle, said hub bearing unit comprising a rotating bearing ring and a non-rotating bearing ring, where the rotating bearing ring has at least a radially extending wheel mounting flange with a reference flange surface.

BACKGROUND TO THE INVENTION

In a typical wheel end assembly, a brake rotor may be fitted to the mounting flange of the rotating bearing ring of the hub unit. The wheel rim is then mounted against the brake rotor and both are bolted to the wheel mounting flange. The hub-rotor interface is exposed to atmospheric corrosion from humid air and from salt water. The corrosion leads to the formation of rust on and between the contacting surfaces of the wheel mounting flange, brake rotor and wheel rim. The layer of corrosion that forms on the wheel mounting flange surface results in increased runout, which may exceed that specified for finished and assembled hub units of e.g. 10 to 15 micro meters. When vehicles are serviced and undergo replacement of a brake rotor, the fixation of a (new) brake rotor on a wheel mounting flange having corrosion on the contact surface for the brake rotor would lead to axial runout and brake shudder.

US 2006/0177169 A1 discloses a hub unit with a wheel mounting flange for mounting a wheel on the hub. The flange is provided with a rust-preventive layer on the surface receiving the wheel. This rust-preventive layer may be a fused ceramics material or a plastic material either moulded onto the surface by insert moulding or a separate part fixed to the surface by an adhesive.

EP 0 800 011 A2 discloses a corrosion-protective element for protecting junctions between metal components made of different metals against electrolytic corrosion when exposed to moisture by providing a shield of sheet metal which is electrically passivated or has an anti-corrosion coating on its opposite surfaces.

It is further known to provide electrolytic zinc plating on the hub flange surface to prevent corrosion. The electrolytic plating is usually a bath process where at least the component in which the flange is formed is submerged in molten zinc and subjected to high temperature (over 150° C.) baking to eliminate hydrogen embrittlement.

SUMMARY OF THE INVENTION

By the invention, corrosion protection of the surface of the wheel mounting flange of a hub bearing unit is realized in a cost-effective manner by providing a hub bearing unit, wherein a gasket with at least a sacrificial metal gasket surface is provided on the flange surface. The sacrificial gasket comprises a radially oriented disc portion. Moreover, the gasket is adapted for attachment on the reference flange surface, before the mounting of a brake rotor or wheel against the wheel mounting flange.

According to the invention, corrosion protection of the wheel mounting flange of a hub bearing unit for a vehicle is provided which is advantageous due to low production costs and which is easy to provide in an in-line process for the production of the hub bearing unit. According to the invention, the corrosion protection of the wheel mounting flange of a hub bearing unit is achieved by means of a cathodic protection principle. When exposed to a corrosion environment, the sacrificial gasket will corrode before the wheel mounting flange.

Hereby, corrosion protection is achieved in a manner that can be implemented as a straightforward and fast inline process, which besides allowing for low production costs, also offers an environmentally friendly solution using a sacrificial principle to prevent rust of the hub bearing unit flange surface.

By providing a gasket that is electrolytically sacrificial, corrosion protection of the wheel mounting flange satisfying the industry standard ASTM B117 may be achieved. Moreover, the solution according to the invention does not result in loosening of bolt torque when a brake rotor and wheel rim are fixed to the wheel mounting flange. The sacrificial gasket also offers a satisfactory resistance to bolt load and has anti-fretting and failure-safe properties, just as the sacrificial gasket has a satisfactory resistance to hot brake fluid, preservatives and cleaning fluids, and does not adversely affect the performance of the hub bearing unit in the vehicle's wheel end.

Another advantage of the invention is that a hub gasket made of sacrificial metal according to the invention may be retrofitted to existing vehicle hub bearing units.

The wheel hub bearing unit according to the invention preferably comprises a rotating ring member with at least one annular track which cooperates with at least one annular track on the non-rotating ring member and accommodates rolling elements in said annular tracks for rotatably mounting the ring members in relation to each other. Accordingly, the hub unit may be provided with either balls, rollers or a combination thereof as rolling elements for the bearing. Moreover, the hub unit may also be provided as a plain bearing.

In one embodiment, a first ring member is a rotating inner ring and a second ring member is a stationary outer ring of the hub bearing unit. However, as an alternative, the first ring member may be a rotating outer ring and the second ring member may be a stationary inner ring of the hub bearing unit. The rotating ring member of the hub bearing unit comprises at least a radially extending wheel mounting flange.

The sacrificial metal gasket according to the invention has a thickness of 0.01 to 1.0 mm. In a first embodiment, the gasket may be made of a sheet of sacrificial metal, in which case the thickness of the sacrificial gasket is preferably 0.15 to 0.5 mm. In a second embodiment, the gasket may be made of a steel sheet coated with the sacrificial metal on both sides. The thickness of the gasket is then preferably 0.2 to 0.5 mm. The thickness of the coated sacrificial layer may be between 0.001 and 0.2 mm, and is preferably in the region of 0.01 to 0.05 mm, to enable machining if this is necessary. In one example of the coated steel sheet embodiment, the gasket may be provided with a sealant at its outer annular rim, if it is found necessary to close the exposed steel around the edge of the gasket. Furthermore, in the first and second embodiments of the sacrificial gasket, the surface of the gasket may be passivated by means of e.g. chromating.

In a preferred embodiment, the rotating ring member of the hub bearing unit is made of a steel alloy. The sacrificial metal is preferably zinc or a zinc alloy, such as zinc-aluminium alloy, preferably ZnAl15. However, it should be understood that other suitable metals may be used for the electrolytically sacrificial metal. The use of ZnAl15, i.e. an alloy with a composition of approx. 85% zinc and approx 15% aluminium, is advantageous as this alloy material is readily available and inexpensive to obtain. Moreover, this particular zinc alloy also provides excellent corrosion protection for various environments.

The hub bearing unit is provided with fixation means on the wheel mounting flange. The fixation means may be either stud bolts projecting out of the surface of the mounting flange, or threaded holes for receiving attachment bolts for bolting the sacrificial gasket, brake rotor and wheel rim to the mounting flange. The sacrificial gasket is provided with openings corresponding to the bolt positions of the fixation means on the flange surface, so that the gasket does not interfere with the mounting of a brake rotor and/or a wheel on the hub unit.

In some hub bearing unit designs, the wheel mounting flange has an axial extension, known as a spigot, to facilitate proper centering of the brake rotor and wheel rim during assembly. Corrosion protection on the surface of the spigot is also desirable. In one embodiment of such a hub bearing unit according to the invention, the surface of the spigot may be provided with an anti-corrosion coating or the like. In another embodiment, the sacrificial gasket comprises the radially oriented disc portion and further comprises a tubular sleeve portion, which fits over the spigot. The tubular sleeve portion then provides cathodic protection to the spigot. Furthermore, a protective cap engaging the tubular sleeve portion of the gasket may be provided for enclosing the central opening in the gasket. This cap could also be provided with a sacrificial metal coating and thereby contribute to the cathodic protection of the hub bearing unit.

The sacrificial gasket may be held in position between the brake rotor and the flange by the mounting forces there between. Alternatively, the sacrificial gasket may be fixed to the mounting flange by gluing or some other adhesive means, like a self-adhesive foil, or by a heat joining technique like welding, or by mechanical means.

Throughout this patent, the term sacrificial metal is meant to be understood as a metal which in the electrolytic sense is sacrificial compared with the metal used for the rotating ring member and in particular the wheel mounting flange.

DESCRIPTION OF THE FIGURES

In the following, the invention is described with reference to the accompanying drawings, in which:

FIG. 1 is a side view of a gasket according to a first embodiment of the invention;

FIG. 2 is a radial section through a hub bearing unit according to a first embodiment of the invention;

FIG. 3 is a side view of a gasket according to a second embodiment of the invention;

FIG. 4 is a radial section through a hub bearing unit according to a second embodiment of the invention;

FIG. 5 is a side view of a gasket according to a third embodiment of the invention;

FIG. 7 is a front view of a gasket according to an embodiment of the invention.

DESCRIPTION OF PREFERRED EMBODIMENTS

Figure 6:
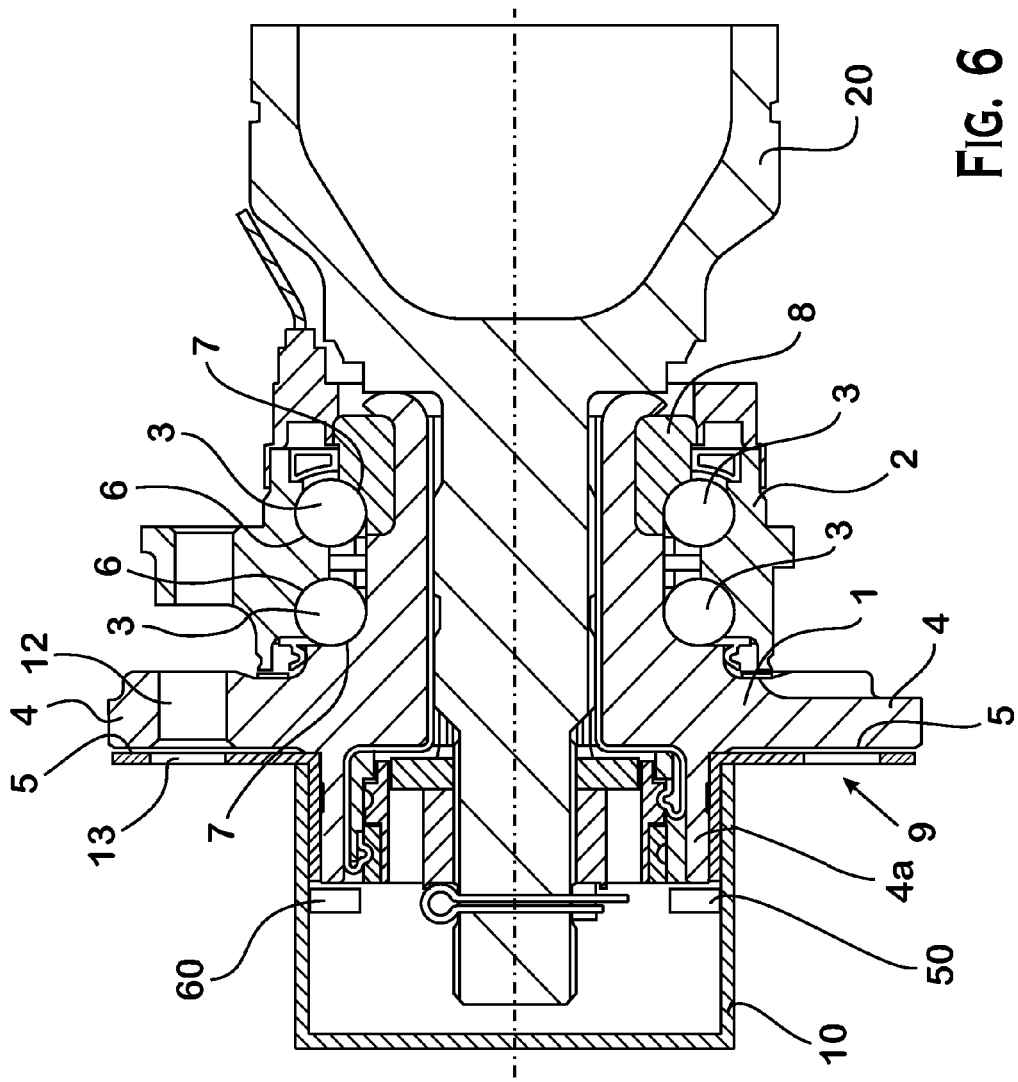
FIG. 6 is a radial section through a hub bearing unit according to a third embodiment of the invention.

With reference to FIGS. 2, 4 and 6, examples of hub bearing units with rotating inner ring are shown. Such hub bearing units are used in the automotive industry for supporting driven and non-driven wheels and brake rotors, which are secured to a wheel mounting flange 4. A hub bearing unit comprises an inner ring member 1, which is rotatably mounted in relation to an outer ring member 2. The inner and outer ring members 1, 2 are assembled in a bearing unit, as the inner ring member 1 is provided with at least one raceway, which is an annular track supporting rolling elements 3, such as balls, which are also accommodated in at least one annular track 6 in the outer ring member 2. The rolling elements 3 accommodated in the track 7 of the inner ring member 1 are preferably held in place by a separate inner ring element 8 for facilitating assembly of the bearing unit. The outer ring member 2 is fixed to the frame of the vehicle and the inner ring member 1 is assembled on a shaft-like member 20 (see FIG. 6), which may be a drive section in the case of a driven wheel or a centering section in the case of a non-driven wheel. The inner ring member 1 is provided with a flange 4 having an exterior surface 5 for receiving a brake rotor and a wheel rim (not shown).

The mounting flange 4 is provided with a plurality of fixation means 12, such as threaded holes for receiving mounting bolts (not shown), but could alternately be stud bolts 40 projecting out of the flange surface 5.

According to the invention, a gasket 9 is provided for at least substantially covering the flange surface 5. During use, the mounting flange 4 and in particular the axially outward surface 5 of the flange 4 are exposed to moisture. In order to protect the flange 4 against corrosion, the gasket 9 comprising at least coating layers on either side of an electrolytically sacrificial metal, preferably zinc or a zinc alloy such as ZnAl15, is mounted to the flange surface 5. Alternatively the gasket 9 is made from a metal sheet made of a sacrificial metal, preferably ZnAl15 or similar zinc-aluminium alloy.

The flange surface 5 extends radially. In the embodiment shown in FIGS. 1 and 2, the gasket 9 is of a flat configuration made from a sheet metal, such as a thin steel sheet coated with a zinc alloy, e.g. ZnAl15. The gasket 9 is provided with a plurality of holes 13 corresponding to the fixation means 12 on the flange 4 of the hub bearing unit. As shown in FIG. 7, the gasket holes 13 are positioned on the gasket 9 so that the gasket 9 fits onto the mounting flange surface 5 without causing any interference with the function of the mounting flange 4. The outer contour of the gasket 9 can be circular or non-circular, e.g. following the contour of the mounting flange.

As shown in FIGS. 2, 4 and 6, the flange surface 5 may also include an axial extension or spigot 4a. The gasket 9 shown in FIGS. 3-6 has a radially extending gasket portion 9r and a tubular sleeve portion 9a, which is adapted to perform a tight fit around the spigot 4a on the mounting flange 4 on the inner ring 1 of the hub bearing unit. Hereby, corrosion protection of the surface of the spigot 4a may also be provided. The tubular sleeve portion 9a may be provided with the same or a different thickness than the radial portion 9a of the gasket 9. The tubular sleeve portion 9a may be provided as a separate part which may be mounted as a separate piece or joined with the radial portion 9r. Alternatively, the tubular sleeve portion 9a of the gasket 9 may be formed integrally during the gasket manufacturing process.

As indicated on FIGS. 2 and 4, the gasket 9 may be, provided with adhesive means 14 on the surface (of the radial portion 9r in the embodiment of FIG. 4) of the gasket 9 facing towards the flange surface 5 of the hub unit. The adhesive means 14 may be glue or a self-adhesive foil, such as a double-sided self-adhesive foil.

With reference to FIGS. 5 and 6, the shaft-like member 20 mounted in the hub bearing unit may be protected by a cap 10 provided on the gasket 9. This cap 10 may be provided with a sacrificial metal coating and thereby contribute to the corrosion protection of the hub bearing unit. In addition, the cap portion 10 of the sacrificial gasket may be equipped with sensors 60, such temperature and/or load sensors, and contain electronics 50 for controlling the wheel end functions and/or the dynamic stability of the vehicle. In addition, the cap portion 10 of the sacrificial gasket may be equipped with sensors, such temperature and/or load sensors, and contain electronics for controlling the wheel end functions and/or the dynamic stability of the vehicle.

Above, the invention is described with reference to some preferred embodiments. However, a hub unit according to the invention may be executed in many embodiments. For instance, the hub bearing unit may be of the type with rotating inner ring or with rotating outer ring. In this latter case, the outer ring member then comprises at least a radially extending mounting flange for attachment of a brake rotor and wheel rim. The sacrificial gasket as described in any of the above embodiments can also be applied on a hub bearing unit with rotating outer ring. Likewise, the rolling elements 3 may be balls (as described above) or rollers or a combination thereof. Thus, variations of the embodiments of the invention described may be performed without departing from the scope of the invention defined in the claims.

The invention claimed is:

1. A wheel hub bearing unit for a vehicle, said hub bearing unit comprising:
   a rotating bearing ring member having a radially extending wheel mounting flange with a reference flange surface;
   a non-rotating bearing ring member; and
   a gasket with at least a sacrificial metal gasket surface disposed on the flange surface.

2. The wheel hub bearing unit according to claim 1, wherein at least the rotating ring member is made of a steel alloy.

3. The wheel hub bearing unit according to claim 1, wherein the rotating ring member has at least one annular track cooperating with at least one annular track on the non-rotating ring member, the hub bearing unit further comprising rolling elements disposed in said annular tracks for rotatably mounting the ring members to each other.

4. The wheel hub bearing unit according to claim 1, wherein the rotating ring member is a rotating inner ring and the non-rotating ring member is a stationary outer ring of the hub bearing unit.

5. The wheel hub bearing unit according to claim 1, wherein the has a thickness of between about 0.01 mm and about 1.0 mm.

6. The wheel hub bearing unit according to claim 1, wherein the entire gasket is made of said sacrificial metal.

7. The wheel hub bearing unit according to claim 1, wherein the gasket includes a thin steel sheet having opposing sides and being coated with the sacrificial metal on both sides.

8. The wheel hub bearing unit according to claim 1, wherein the sacrificial metal includes at least one of zinc and a zinc alloy.

9. The wheel hub bearing unit according to claim 1, wherein the gasket has an outer annular rim and a sealant on the rim.

10. The wheel hub bearing unit according to claim 1, wherein the hub unit includes fixation means on the mounting flange.

11. The wheel hub bearing unit according to claim 10, wherein the fixation means includes stud bolts projecting from the surface of the mounting flange.

12. The wheel hub bearing unit according claim 10, wherein the fixation means include threaded holes in the mounting flange configured to receive attachment bolts.

13. The wheel hub bearing unit according to claim 10, wherein the fixation means includes bolts on the flange surface and the gasket includes openings located at positions corresponding to bolt positions of the fixation means.

14. The wheel hub bearing unit according to claim 1, wherein the gasket includes a radially oriented disk portion and a tubular sleeve portion.

15. The wheel hub bearing unit according to claim 14, wherein the gasket has a central opening and the hub bearing unit further comprises a protective cap configured to engage the tubular sleeve portion of the gasket so as to enclose the central opening in the gasket.

16. The wheel hub bearing unit according to claim 15, wherein the protective cap encloses electronic means for at least one of controlling vehicular functions and monitoring vehicular functions.

17. The wheel hub bearing unit according to claim 16, wherein the electronic means comprises at least one sensor.

18. The wheel hub bearing unit according to claim 1, wherein the gasket includes adhesive means for fixing the gasket to the flange surface.

19. The wheel hub bearing unit according to claim 18, wherein the adhesive means is one of glue and a self-adhesive foil.

20. The wheel hub bearing unit according to claim 1, wherein the gasket is attached to the mounting flange by mechanical fixation means.

21. The wheel hub bearing unit according to claim 1, wherein the gasket is attached to the mounting flange by a heat joining process.

22. A metallic gasket for a hub bearing unit, the hub bearing unit including a rotating bearing ring member and a non-rotating bearing ring member, the rotating bearing ring having at least a radially extending wheel mounting flange with a reference flange surface, the gasket comprising:
   a body having a sacrificial metal gasket surface and being adapted for attachment on the reference flange surface of the rotating bearing ring member before mounting one of a wheel and a brake rotor onto the rotating ring member mounting flange.

23. The gasket according to claim 22, wherein the gasket is made of said sacrificial metal.

24. The gasket according to claim 23, wherein the sacrificial metal gasket has a thickness of between about 0.01 mm and about 1.0 mm.

25. The gasket according to claim 22, wherein the gasket includes a steel sheet having opposing sides and being coated with the sacrificial metal on both sides.

26. The gasket according to claim 25, wherein the sacrificial metal gasket has a thickness of between about 0.01 mm and about 1.0 mm.

27. The gasket according to claim 26, wherein the sacrificial metal coating has a thickness of between about 0.001 mm to about 0.2 mm.

28. The gasket according to claim 22, wherein the sacrificial metal is one of zinc and zinc alloy.

* * * * *